(12) United States Patent
Takeuchi et al.

(10) Patent No.: US 7,260,952 B2
(45) Date of Patent: Aug. 28, 2007

(54) FLUID MACHINE

(75) Inventors: Yasuhiro Takeuchi, Kariya (JP);
Shigeki Iwanami, Okazaki (JP);
Hironori Asa, Okazaki (JP); Yasushi Yamanaka, Nakashima-gun (JP);
Atsushi Inaba, Kariya (JP); Hiroshi Ogawa, Nagoya (JP)

(73) Assignees: DENSO Corporation, Kariya (JP);
Nippon Soken, Inc., Nishio (JP)

( * ) Notice: Subject to any disclaimer, the term of this patent is extended or adjusted under 35 U.S.C. 154(b) by 186 days.

(21) Appl. No.: 11/113,987

(22) Filed: Apr. 26, 2005

(65) Prior Publication Data

US 2005/0235670 A1 Oct. 27, 2005

(30) Foreign Application Priority Data

Apr. 26, 2004 (JP) ............................. 2004-130012

(51) Int. Cl.
*F25B 27/00* (2006.01)
*F25D 9/00* (2006.01)
(52) U.S. Cl. ...................................... 62/238.6; 62/401
(58) Field of Classification Search ................ 60/597, 60/605.1; 62/238.6, 238.4, 323.1, DIG. 2, 62/323.2, 401, 402, 86, 87
See application file for complete search history.

(56) References Cited

U.S. PATENT DOCUMENTS

| | | | | |
|---|---|---|---|---|
| 3,667,214 A | * | 6/1972 | Addie | .......................... 60/608 |
| 4,823,560 A | * | 4/1989 | Rowley et al. | ................ 62/467 |
| 4,876,856 A | * | 10/1989 | Iishiki et al. | .................. 60/671 |
| 4,924,674 A | * | 5/1990 | Hara et al. | ..................... 60/608 |
| 4,932,211 A | * | 6/1990 | Buthmann et al. | ............ 60/607 |
| 5,031,397 A | * | 7/1991 | Firey | ........................... 60/787 |
| 5,129,236 A | * | 7/1992 | Solomon | .................... 62/324.1 |
| 5,172,753 A | * | 12/1992 | Kadle et al. | ................... 165/42 |
| 5,313,874 A | * | 5/1994 | Lackstrom | .................... 91/459 |
| 5,579,640 A | * | 12/1996 | Gray et al. | ................... 60/413 |
| 6,301,922 B1 | * | 10/2001 | Ochi | ........................... 62/402 |
| 6,935,129 B2 | * | 8/2005 | Sasaki et al. | .............. 62/238.4 |
| 7,178,358 B2 | * | 2/2007 | Inaba et al. | ................... 62/498 |
| 2004/0187506 A1 | | 9/2004 | Iwanami et al. | |
| 2004/0231331 A1 | | 11/2004 | Iwanami et al. | |

FOREIGN PATENT DOCUMENTS

JP B2-2540738 7/1996

* cited by examiner

*Primary Examiner*—Mohammad M. Ali
(74) *Attorney, Agent, or Firm*—Posz Law Group, PLC

(57) ABSTRACT

A fluid machine has a compressor device for compressing refrigerant of a refrigerating cycle for an automotive vehicle, an electric rotating device operating as an electric motor for generating a rotational driving force to drive the compressor device or operating as an electric power generator, an expansion device for collecting waste heat from an engine and generating a rotational driving force to drive the electric rotating device and/or the compressor device, and a switching device for connecting or disconnecting the compressor device with or from the expansion device. In the fluid machine, the waste heat from the engine can be always collected by the expansion device, irrespectively whether or not the compressor device is operating for an air conditioning operation.

11 Claims, 5 Drawing Sheets

FLUID MACHINE

CROSS REFERENCE TO RELATED APPLICATION

This application is based on Japanese Patent Application No. 2004-130012 filed on Apr. 26, 2004, the disclosure of which is incorporated herein by reference.

FIELD OF THE INVENTION

The present invention relates to a fluid machine having multiple functions of gas compression, electric power generation, and collection and utilization of waste heat, and in particular relates to a fluid machine used for a refrigerating cycle for a motor vehicle having a Rankine cycle for collecting the waste heat.

BACKGROUND OF THE INVENTION

In a prior art fluid machine, as disclosed, for example, in Japanese Patent No. 2540738, a compressor device for a vapor compression refrigerating cycle is commonly used as an expansion device, and the compressor device is used as the expansion device when energy is collected by Rankine cycle.

In the above fluid machine, the compressor device is used as a compressor for air conditioning operation, wherein the compressor device compresses the refrigerant in the refrigerating cycle. The compressor device is used as an expansion device, when the air conditioning operation is stopped, wherein superheated gas-phase refrigerant generated in the Rankine cycle by use of the waste heat from the engine is supplied to the fluid machine. The refrigerant is expanded in the fluid machine to operate as the expansion device and energy generated by the expansion device is applied to the engine.

In the above prior art fluid machine, in which the compressor device is also used as the expansion device, the fluid machine can be used as the expansion device only during a time period in which the air conditioning operation is not necessary. As a result, the prior art fluid machine can not most efficiently improve a fuel consumption ratio for the engine.

The inventors of the present invention proposed a fluid machine in a prior Japanese patent application (JP 2003-82760), in which a compressor device 140 and an expansion device 150 are independently provided and connected to each other by a driving shaft 111, so that the expansion device 150 for collecting and utilizing the waste heat can be operated, irrespectively whether or not the compressor device 140 is operated for an air conditioning operation.

According to the above proposed fluid machine, the compressor device 140 is a variable capacitor type (a swash plate type) compressor, and a discharge amount of the compressor device 140 is adjusted to become zero, when the air conditioning operation is not necessary. Accordingly, a resistance of the compressor device 140 is reduced when the expansion device 150 is in its operation.

In the above proposed fluid machine, although the discharge amount of the compressor device 140 is adjusted to become zero to reduce the resistance by the compressor device 140 to the expansion device 150, mechanical loss due to friction in sliding portions of a capacitor varying mechanism (such as, a swash plate 140B in a swash plate chamber 140A, and shoes 140C) can not be avoided. As a result, the expansion device 150 can not sufficiently collect and utilize the waste heat.

SUMMARY OF THE INVENTION

It is, therefore, an object of the present invention, in view of the above mentioned problems, to provide a fluid machine in which an expansion device can be always operated to collect an utilize the waste heat independently from an operation of a compressor device, and the waste heat can be effectively collected and utilized without causing a mechanical loss.

According to a feature of the present invention, a fluid machine has a compressor device for compressing refrigerant of a refrigerating cycle for an automotive vehicle, an electric rotating device operating as an electric motor for generating a rotational driving force to drive the compressor device or operating as an electric power generator, an expansion device for collecting waste heat from an engine and generating a rotational driving force to drive the electric rotating device and/or the compressor device, and a switching device for connecting or disconnecting the compressor device with or from the expansion device.

According to the above feature of the present invention, the waste heat from the engine can be always collected by the expansion device, irrespectively whether or not the compressor device is operating for an air conditioning operation. In this operation, the compressor device is connected to the expansion device, and thereby the compressor device can be driven by not only the driving force from the engine but also the driving force generated at the expansion device.

According to the above feature, the compressor device is disconnected from the expansion device, when the operation of the compressor device is not necessary. Accordingly, the expansion device can operate without receiving a resistance from the compressor device.

According to another feature of the present invention, a fluid machine has a compressor device for compressing refrigerant of a refrigerating cycle for an automotive vehicle, an electric rotating device operating as an electric motor for generating a rotational driving force to drive the compressor device or operating as an electric power generator, an expansion device for collecting waste heat from an engine and generating a rotational driving force to drive the electric rotating device and/or the compressor device, and a switching device for connecting or disconnecting the expansion device with or from the electric rotating device. The compressor device of this fluid machine has a further function of an expansion device, so that the compressor device can be operated as the expansion device, when the air conditioning operation is not required.

The fluid machine further has a transmission device provided between the compressor device and the electric rotating device. When the driving force is transmitted from the compressor device to the electric rotating device, or vice versa, the rotational speed is changed by the transmission device, so that the electric rotating device can be made smaller in size, and a higher output of the electric power can be obtained from the electric rotating device.

According to a further feature of the present invention, the switching device provided between the expansion device and the electric rotating device allows a transmission of the driving force from the expansion device to the electric rotating device and prohibits a transmission of the driving force from the electric rotating device to the expansion device. As a result, when the electric rotating device is rotated by the rotational driving force generated at the compressor device (operating as the expansion device), the electric rotating device can be rotated without receiving a resistance from the expansion device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A first embodiment of the present invention will now be explained with reference to FIGS. 1 and 2. In the embodiment, a fluid machine 100 of the present invention is used to, for example, a refrigerating cycle 20 having a Rankine cycle 30 for a motor vehicle, in which an engine 10 is temporarily stopped depending on a running condition of the vehicle (an idling stop operation), or which is equipped with a hybrid driving motor. The refrigerating cycle 20 having the Rankine cycle 30 collects waste heat generated at the engine 10 for driving the vehicle, and utilizes the cold and hot energy generated at the refrigerating cycle 20 for performing an air conditioning operation. The refrigerating cycle with the Rankine cycle 30 is explained.

Figure 1:
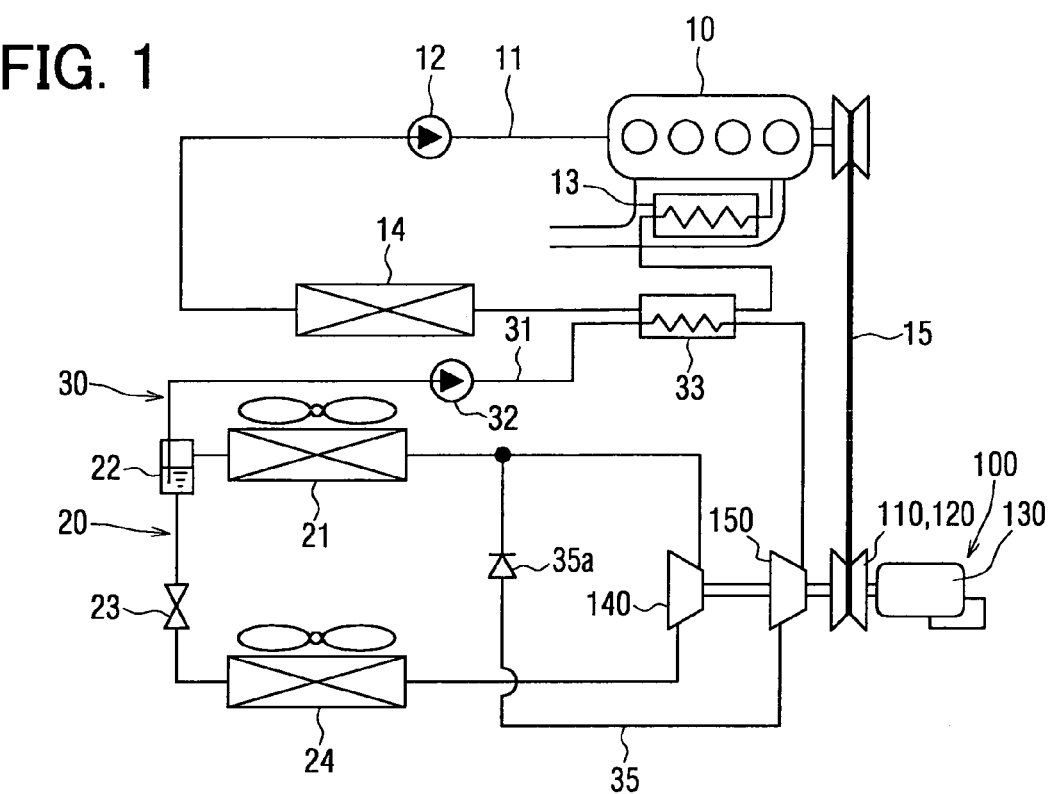
FIG. 1 is a schematic diagram showing a total system for a refrigerating cycle and a waste heat collecting cycle according to a first embodiment of the present invention.
Figure 2:
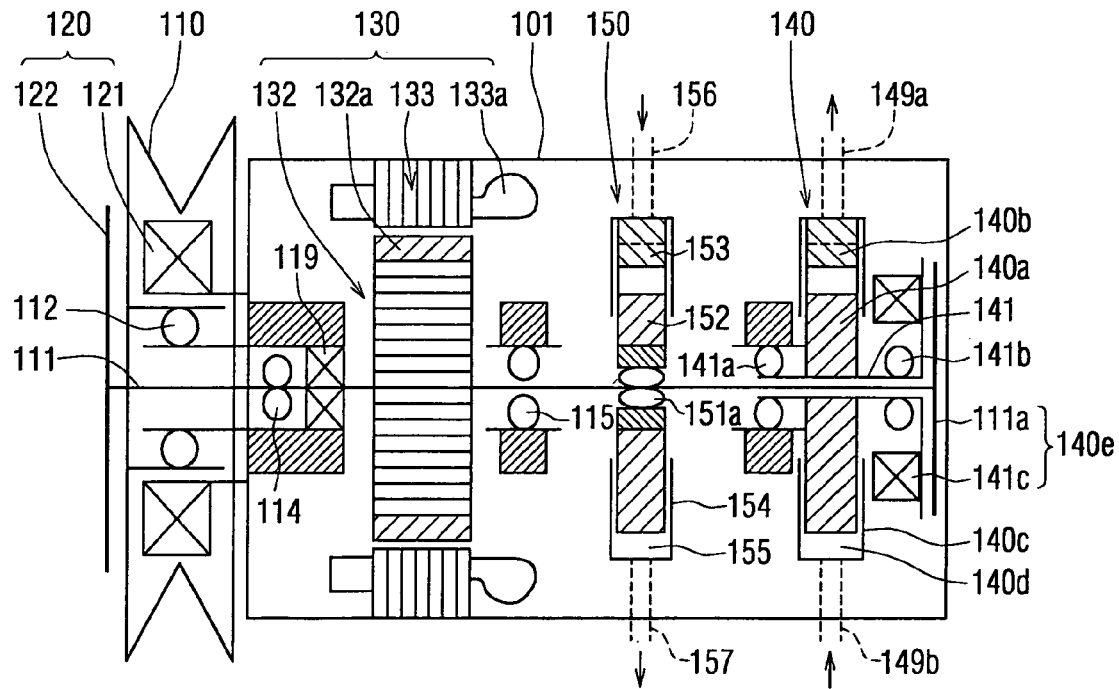
FIG. 2 is a cross-sectional schematic view of a fluid machine according to the first embodiment of the present invention.

As shown in FIG. 1, a radiator circuit 11 is provided to the engine 10 (an external driving source), in which engine cooling water is circulated by a radiator pump 12. A heater device 13 is provided in the radiator circuit 11, for heating the engine cooling water by heat exchange with exhaust gas from the engine 10. The engine cooling water heated at the heater device 13 is cooled down by a radiator 14, after the cooling water heated refrigerant of the refrigerating cycle when the refrigerant flows through a refrigerant heating device 33 provided in the Rankine cycle 30. The radiator pump 12 is of a mechanical type operated by a driving force from the engine 10. It is, however, can be replaced by an electrical pump driven by an electric motor.

The fluid machine 100 comprises a compressor device 140 and an expansion device 150. A heat radiating device 21 is connected to a discharge side (a high pressure port 149a) of the compressor device 140, as explained later, at which the refrigerant is cooled down by radiating the heat. More detailed structure of the fluid machine 100 is explained later.

A gas-liquid separator 22, a depressurizing device 23 and an evaporator 24 are connected in this order at a downstream side of the heat radiating device 21, and then connected to an inlet side (a low pressure port 149b) of the compressor device 140.

The gas-liquid separator 22 is a receiver for dividing the refrigerant from the heat radiating device 21 into a gas-phase refrigerant and a liquid-phase refrigerant. The depressurizing device 23 is an expansion valve of a temperature-dependant type for expanding and decreasing the pressure of the liquid-phase refrigerant from the gas-liquid separator 22, more particularly for decreasing the pressure of the refrigerant in an isenthalpic manner and controlling an opening degree of a passage for the refrigerant so that the degree of superheat of the refrigerant to be sucked into the compressor device 140 will be maintained at a predetermined value. The evaporator 24 is a heat exchanger for cooling down the air for an air conditioning operation, as a result of absorbing the heat from the air by evaporating the refrigerant depressurized by the expansion valve 23.

The compressor device 140, the heat radiating device 21, the gas-liquid separator 22, the depressurizing device 23 and the evaporator 24 form the refrigerating cycle for transferring the heat from a low temperature side to a high temperature side.

A first bypass passage 31 is provided between the gas-liquid separator 22 and the expansion device 150 (an inlet port 156 explained later). A refrigerant pump 32 is provided in the first bypass passage 31 for circulating the refrigerant to the expansion device 150. The refrigerant heating device 33 is also provided in the first bypass passage 31, in which the refrigerant is heated by the engine cooling water. The refrigerant pump 32 is an electric pump in this embodiment, and it is operated and controlled by a control unit (not shown).

A second bypass passage 35 is provided between the expansion device 150 (an outlet port 157 explained later) and the heat radiating device 21. A check valve 35a is provided in the second bypass passage 35 for only allowing the refrigerant to flow from the expansion device 150 to the heat radiating device 21.

The Rankine cycle 30 is formed by the heat radiating device 21, the gas-liquid separator 22, the refrigerant pump 32, the refrigerant heating device 33 and the expansion device 150, so that the heat generated at the engine 10 is collected.

A structure of the fluid machine 100 is explained with reference to FIG. 2. The fluid machine 100 comprises a pulley 110, an electromagnetic clutch 120, an electric motor (an electric rotating device) 130, the compressor device 140, and the expansion device 150. The above components are arrange in series, and housed in a housing 101.

The pulley 110 (an external driving portion) is rotationally supported by the housing 101 via a pulley bearing 112 fixed to the housing 101 and is rotated by a belt 15 (FIG. 1) driven by the engine 10. A driving shaft 111 is provided at a center of the pulley 110 and extends to the compressor device 140, as explained later. The driving shaft is rotationally supported by bearings 114 and 115 fixed to the housing 101. Hereinafter, a direction of the rotation of the pulley 110 (the driving shaft 111) is referred to as a forward direction, whereas a reversed direction is referred to as a backward direction. A shaft seal 119 is provided at the bearing 114, for hermetically sealing the bearing 114.

The electromagnetic clutch 120 (an on-off device) comprises an electromagnetic coil 121 fixed to the housing 101, and a friction plate 122 provided at an end of the driving shaft 111. As well known, when electric power is supplied to the electromagnetic coil 121 by the control unit, the friction plate 122 is displaced and connected to the pulley 110, so that the rotational force of the pulley 110 is transmitted to the driving shaft 111 (On-condition of the clutch). When the supply of the electric power to the coil 121 is cut off, the friction plate 122 is separated from the pulley 110, and the transmission of the driving force is cut off (Off-condition of the clutch).

The electric motor 130 has two functions, i.e. as the electric motor and an electric power generator, and comprises a rotor portion 132 and a stator portion 133. The electric motor 130 is housed in the housing 101 on a side to the pulley 110. The rotor portion 132 is connected to the driving shaft 111 (also referred to as a motor shaft), and permanent magnets 132a are provided at an outer periphery of the rotor portion 132.

The stator portion 133 has a coil portion 133a and press-fitted into an inner surface of the housing 101. When electric power is supplied to the coil portion 133a from a battery (not shown) through an inverter (not shown), the rotor portion 132 is rotated in the forward direction. On the other hand, when the rotor portion 132 is rotated by the pulley 110 or by the expansion device 150 (as explained later), and thereby when the electric motor 130 is operated as the electrical power generator, the electric power generated at the coil portion 133a is charged into the battery through the inverter, or supplied to other electrical parts (loads).

The compressor device 140 in this embodiment is a vane-type compressor having a fixed capacity, and arranged in the housing 101 on a side opposite to the pulley 110. A compressor shaft 141 is provided on an outer periphery of the driving shaft 111, so that the compressor shaft 141 is relatively rotatable with respect to the driving shaft 111. The compressor shaft 141 is supported by bearings 141a and 141b on the driving shaft 111.

A rotor 140a is fixed to the compressor shaft 141, and multiple vanes 140b are inserted into the rotor 140a in such a manner that the vanes 140b are slidingly movable in radial directions of the rotor 140a. The vanes 140b are housed in an oval cylindrical bore 140c, and the rotor 140a, the vanes 140b and the cylindrical bore 140c form multiple working chambers 140d.

A high pressure port 149a and a low pressure port 149b are provided at the housing 101, wherein the low pressure port 149b is communicated with the working chamber 140d. The working chamber 140d is operatively communicated with the high pressure port 149a through a discharge valve (not shown). The low pressure port 149b is connected to the evaporator 24, and the high pressure port 149a is connected to the heat radiating device 21.

In the compressor device 140, when the driving force from the pulley 110, the electric motor 130, or the expansion device 150 (explained later) is applied to the compressor shaft 141 (when a switching means is connected, as explained later), the rotor 140a as well as the vanes 140b is rotated in the forward direction. The refrigerant is then sucked from the low pressure port 149b into the working chambers, at which the refrigerant is compressed, and discharged through the discharge valve from the high pressure port 149a.

The expansion device 150 is a vane type device similar to the compressor device 140, and is arranged in the housing 101 between the electric motor 130 and the compressor device 140. A rotor 152, having multiple vanes 153, is connected to the driving shaft 111. The rotor 152 and the vanes 153 are housed in an oval cylindrical bore 154, wherein the rotor 152, the vanes 153 and the cylindrical bore 154 form multiple working chambers 155.

A one way clutch 151a is provided between the rotor 152 and the driving shaft 111, wherein the rotor 152 is engaged with the driving shaft 111 when the rotor 152 is rotated in the forward direction. In other words, when the rotor 152 is not rotated or rotated in the forward direction but at a lower speed than the driving shaft 111, the driving shaft 1111 can be rotated in its forward direction with respect to the rotor 152.

An inlet port 156 and an outlet port 157 are provided in the housing 101, wherein the inlet and outlet ports 156 and 157 are respectively communicated with the working chamber 155. The inlet port 156 is connected to the refrigerant heating device 33, and the outlet port 157 is connected to the heat radiating device 21.

When the superheated gas-phase refrigerant, which is heated at the refrigerant heating device 33, is supplied to the expansion device 150 through the inlet port 156, the refrigerant is expanded in the working chambers to rotate the rotor 152 in the forward direction. As a result, a driving force is transmitted to the driving shaft 111. The refrigerant of the low pressure after the expansion is discharged from the outlet port 157.

A switching device 140e is provided between the compressor device 140 and the expansion device 150, in order that it connects or disconnects the compressor device 140 and the expansion device 150. The switching device 140e comprises an electromagnetic clutch having a movable plate 111a fixed to an opposite end of the driving shaft 111 and an electromagnetic coil 141c fixed to the compressor shaft 141. When the electromagnetic clutch 140e is turned on, the driving shaft 111 and the compressor shaft 141 are connected to each other, whereas they are disconnected when the electromagnetic clutch 140e is turned off. The electromagnetic clutch 140e is controlled by the control unit (not shown).

An operation of the above fluid machine is explained.

(1. Operation When the Air Conditioning Operation is Performed)

The refrigerant pump 32 of the Rankine cycle 30 is at first operated by the control unit. In the case that the engine 10 is operated, the electromagnetic clutches 120 and 140e are turned on, so that the driving force of the engine 10 is transmitted to the compressor shaft 141 through the pulley 110 and the driving shaft 111, and the compressor is operated to compress the refrigerant in the refrigerating cycle 20.

The refrigerant is circulated in the order of the compressor device 140, the heat radiating device 21, the gas-liquid separator 22, the depressurizing device 23, the evaporator 24 and the compressor device 140. The air for an air conditioning operation (cooling operation) is cooled down at the evaporator 24. At this operation, the rotor 132 of the electric motor 130 is rotated at the same time, so that the electric power is also generated at the electric motor 130.

Because of the operation of the refrigerant pump 32, the superheated gas-phase refrigerant, which is heated at the refrigerant heating device 33, is supplied into the working chambers 155 of the expansion device 150 through the inlet port 156. The rotor 152 is thereby rotated in the forward direction. When the rotational speed of the rotor 152 is higher than that of the driving shaft 111, the one way clutch 151a is engaged with the driving shaft 111, so that the rotational force generated at the expansion device 150 is applied to the compressor device 140 and the electric motor 130. The refrigerant of the low pressure after the expansion in the expansion device 150 flows back to the refrigerant pump 32 from the outlet port 157 through the second bypass passage 35, the check valve 35a, the heat radiating device 21, the gas-liquid separator 22, the first bypass passage 31.

When the rotational speed of the rotor 152 is lower than that of the driving shaft 111, the one way clutch 151a becomes out of the engagement from the driving shaft 111, so that the expansion device 150 does not adversely affect the rotation of the driving shaft 111 (the operation of the compressor device 140 and the electric motor 130).

In the case that the engine operation is stopped due to an idle-stop operation or at a low speed running of the vehicle (having a hybrid engine), the electromagnetic clutch 120 is turned off by the control unit, whereas the electromagnetic clutch 140e is maintained at its "on" condition. Then, the electric motor 130 is operated as the motor, so that the compressor device 140 is operated by the driving force from the electric motor 130. As above, even in the case that the engine is temporarily stopped, the operation of the compressor device 140 and thereby the air conditioning operation is continued. In this operation, the expansion device 150 is operated (rotated) by the superheated gas-phase refrigerant, and the rotational force of the expansion device 150 is applied to the compressor device 140 and the electric motor 130.

In the case that the waste heat is sufficiently collected from the engine 10 and a sufficient driving force can be obtained at the expansion device 150, the electromagnetic clutch 120 is turned off by the control unit, whether or not the engine 10 is operating. In such a case, the compressor device 140 is operated only by the driving force from the expansion device 140. The driving force of the expansion device 150 is also applied to the electric motor 130 to operate it as the electric power generator.

(2. Operation When the Air Conditioning Operation is Stopped)

The refrigerating pump 32 is operated by the control unit, independently whether the engine 10 is operated or stopped. The electromagnetic clutches 120 and 140e are turned off. The rotor 152 of the expansion device 150 is rotated by the superheated gas-phase refrigerant. The one way clutch 151a is engaged with the driving shaft 111, so that the driving force generated at the expansion device 150 is applied to the electric motor 130 (operating as the electric power generator). Since the electromagnetic clutch 140e is also turned off, the driving force generated at the expansion device 150 is not transmitted to the compressor device 140.

According to the above described embodiment, the fluid machine has the following advantages.

The expansion device 150 is provided in the fluid machine 100, and operatively connected to the compressor device 140 and the electric motor 130, and the electromagnetic clutch 140e is provided between the expansion device 150 and the compressor device 140. As a result, the rotational driving force can be obtained at the expansion device 150 by collecting the waste heat from the engine 10, irrespectively whether the compressor device 140 is operating or not.

In the case that the compressor device 140 is operated for the air conditioning operation, the expansion device 150 is connected with the compressor device 140 by the electromagnetic clutch 140e. As a result, the rotational driving force generated at the expansion device 150 can be applied to the compressor device 140 and/or the electric motor 130.

In the case that the compressor device 140 is not operated, the compressor device 140 is disconnected from the expansion device 150 by the electromagnetic clutch 140e, so that the expansion device 150 can be rotated without being adversely affected by the compressor device 140. The expansion device 150 can, therefore, effectively generate the rotational force and apply the generated rotational force to the electric motor 130 (operating as the electric power generator).

Since the rotational driving force generated at the expansion device 150 is applied to the compressor device 140 or the electric motor 130, the driving force of the engine 10 can be reduced to improve fuel consumption ratio.

Furthermore, since the pulley 110 having the electromagnetic clutch 120 is connected to the compressor device 140, the driving force from the engine 10 can be selectively applied to the compressor device 140, in addition to the rotational force of the expansion device 150 and the electric motor 130.

Since the electric motor 130, the expansion device 150 and the compressor device 140 are arranged in series and integrally housed in the housing 101, the connection among them can be easily obtained. The fluid machine 100 can be made smaller in size, and can be simply mounted in the vehicle.

A transmission device (a speed change gear device) can be provided between the compressor device 140 and the expansion device 150, so that a gear ratio can be changed depending on the rotational speed of the expansion device 150 and thereby the compressor device 140 can be effectively operated at a desired rotational speed.

Second Embodiment

Figure 3:
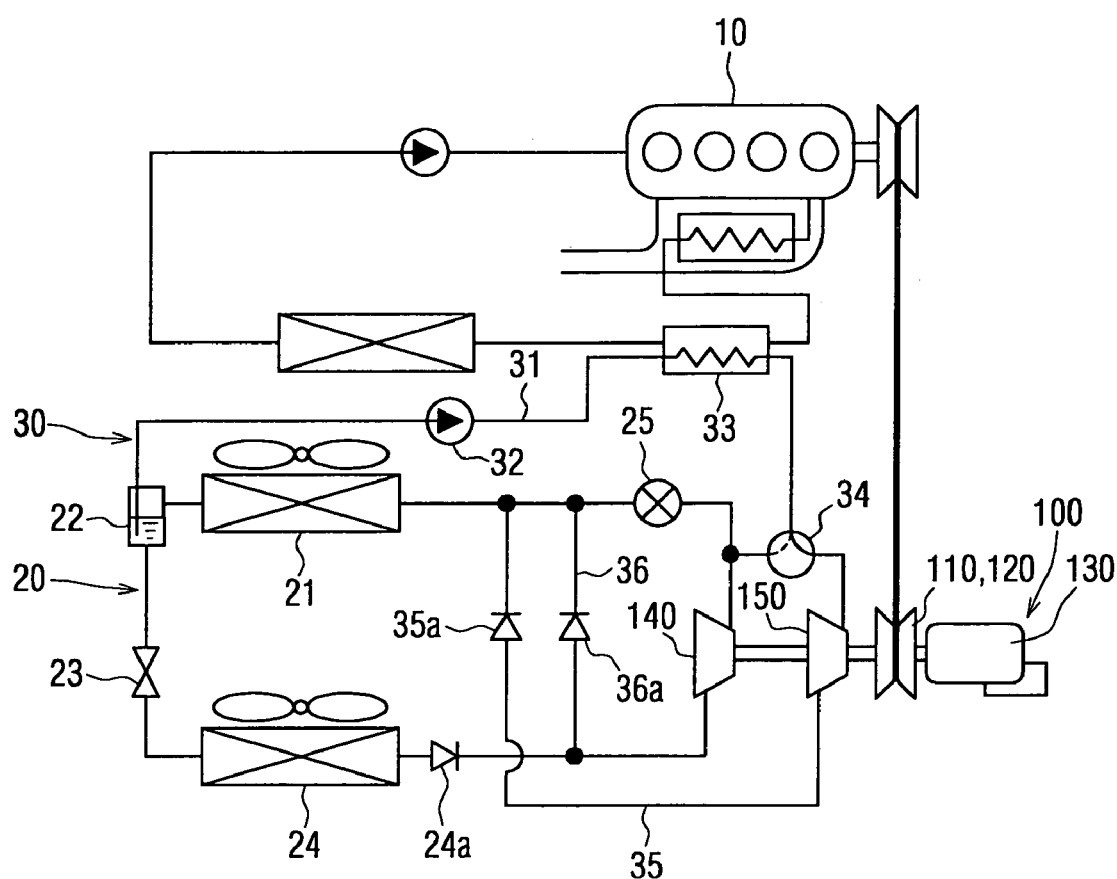
FIG. 3 is a schematic diagram showing a total system for a refrigerating cycle and a waste heat collecting cycle according to a second embodiment of the present invention.
Figure 4:
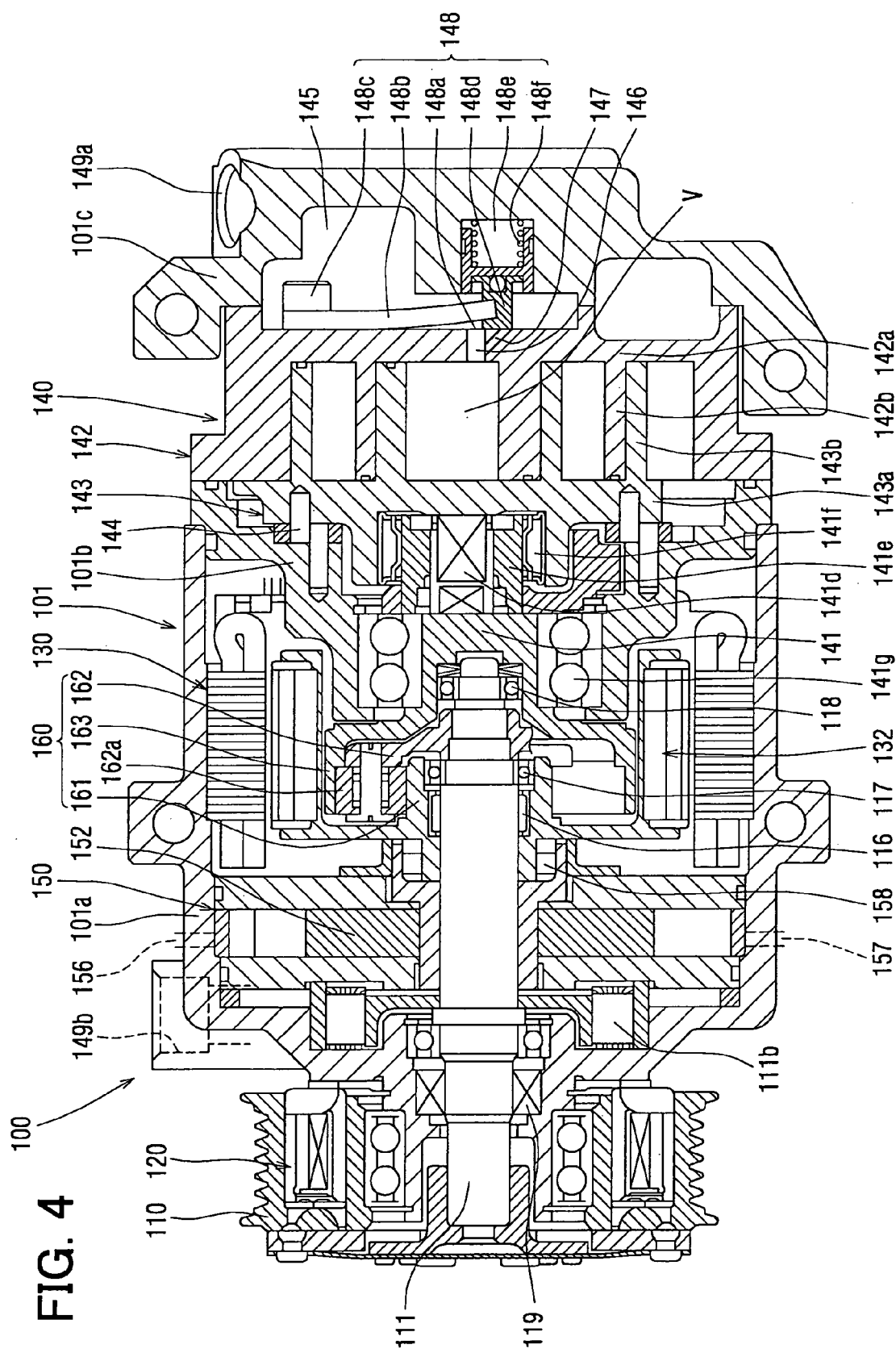
FIG. 4 is a cross-sectional schematic view of a fluid machine according to the second embodiment of the present invention.
Figure 5:
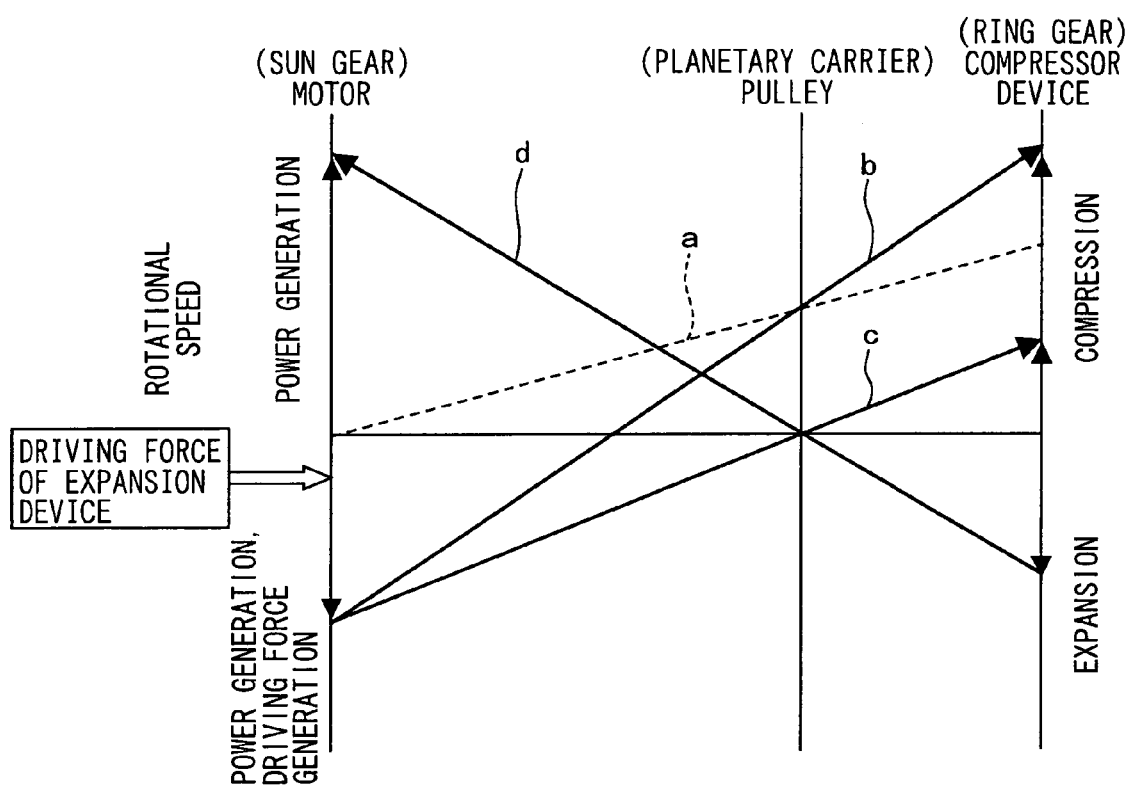
FIG. 5 is a chart for operation of the fluid machine according to the second embodiment.
Figure 6:
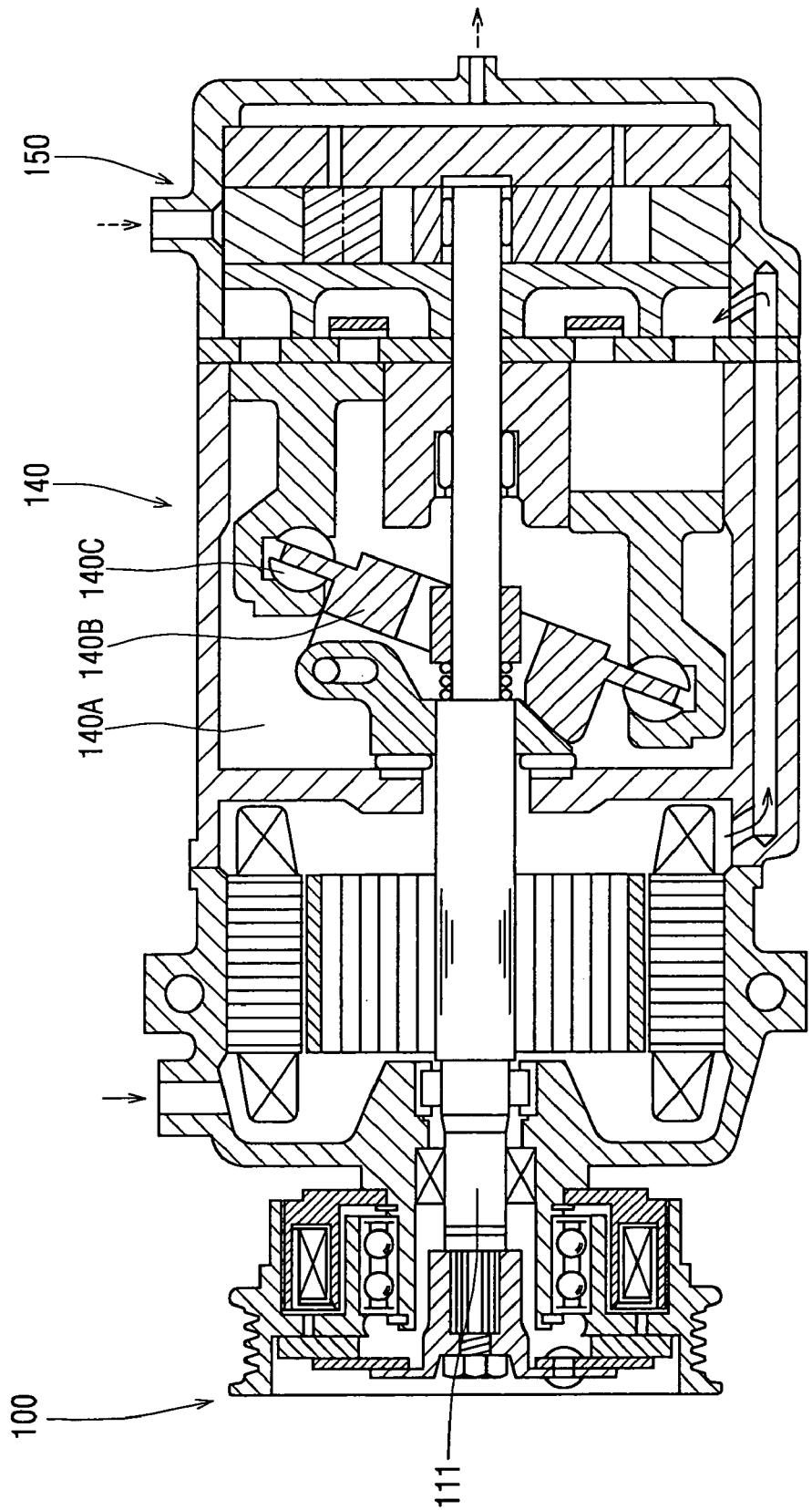
FIG. 6 is a cross-sectional schematic view of a fluid machine proposed in a prior Japanese patent application by the inventors of the present invention.

A second embodiment of the present invention is shown in FIGS. 3 to 5, which differs from the first embodiment in the following points. The compressor device 140 of the fluid machine 100 has a function of the expansion device. The compressor device 140 and the expansion device 150 are connected to the electric motor 130, and a switching device 158 is provided between the electric motor 130 and the expansion device 150. And a transmission device 160 is further provided for changing a power transmission path among the pulley 110, the electric motor 130 and the compressor device 140, and also for changing (increasing or decreasing) the rotational speed of the driving force to be transmitted. Those devices are arranged in an order of the pulley 110, the expansion device 150, the electric motor 130 the transmission device 160 and the compressor device 140, and housed in the housing 101 having a front housing 101a, a middle housing 101b and a rear housing 101c.

In FIG. 3 showing a total system, a refrigerating cycle 20 comprises an on-off valve 25 (made of an electromagnetic valve) provided between a heat radiating device 21 and the compressor device 140, wherein a refrigerant passage is opened or closed by the on-off valve 25. The on-off valve is controlled by a control unit (not shown). A check valve 24a is provided at an outlet side of an evaporator 24, so that refrigerant is allowed to flow only to an inlet side of the compressor device 140. A third bypass passage 36 is provided for connecting the inlet side (a low pressure port) of the compressor device 140 with an inlet side of the heat radiating device 21. A check valve 36a is provided in the third bypass passage 36, so that refrigerant is allowed to flow only from the compressor device 140 to the heat radiating device 21.

In a Rankine cycle 30, a switching valve 34 is provided in a first bypass passage 31, so that superheated gas-phase refrigerant heated at a refrigerant heating device 33 is selectively supplied to either the compressor device 140 or the expansion device 150. The switching valve is controlled by the control unit (not shown).

As shown in FIG. 4, the fluid machine 100 comprises a front housing 101a, a middle housing 101b, and a rear housing 101c. The compressor device 140 has a structure, which is substantially identical to a scroll type compressor, comprising a fixed scroll 142 fixed to the front housing 101a via the middle housing 101b, a movable scroll 143 movable in a space defined by the middle housing 101b and the fixed scroll 142, working chambers V formed by the fixed and movable scrolls 142 and 143, a high pressure chamber 145 formed between the fixed scroll and the rear housing 101c, communication ports 146 and 147 for operatively communicating the working chambers V with the high pressure chamber 145, and a valve means 148 (comprising a discharge valve 148a, a spool 148d and so on, as explained later) for opening and closing the communication ports 146 and 147.

Each of the fixed and movable scrolls 142 and 143 has a base plate portion 142a and 143a and a spiral scroll wrap 142b and 143b respectively extending from the base plate portion toward the other scroll, wherein the scroll wraps are brought into contact to form multiple working chambers V, volume of which is increased or decreased when the movable scroll 143 is rotated.

A compressor shaft 141 is a crank shaft having an eccentric portion 141d at an end of the compressor shaft 141, wherein the eccentric portion 141d is eccentric to a rotational axis of the compressor shaft 141. The eccentric portion 141d is connected to the movable scroll 143 via a bushing 141e and a bearing 141f.

A reference numeral 144 designates an autorotation preventing mechanism for preventing the autorotation of the movable scroll 143 and allowing the orbital motion thereof. When the compressor shaft 141 is rotated by one revolution, the movable scroll 143 is moved around the compressor shaft 141 with the orbital motion, and the volume of the working chamber V will be decreased as the working chamber is moved from the outer position to the inner position. On the other hand, the volume of the working chamber V will be increased as the working chamber is moved from the inner position to the outer position.

The communication port 146 operates as an outlet port for discharging the pressurized refrigerant by communicating the working chamber V, which will reach its minimum volume during the compression operation, with the high pressure chamber 145. The communication port 147 operates as an inlet port for introducing high-temperature and high-pressure refrigerant, namely superheated gas-phase refrigerant, from the high pressure chamber 145 into the working chamber V, the volume of which becomes at its minimum value during the expansion operation.

The high pressure chamber 145 has a function of equalizing the pressure of the refrigerant by smoothing pulsation of the discharged refrigerant through the communication passage 145 (also referred to as a discharge port 145). The high pressure port 149a connected to the heat radiating device 21 is formed in the rear housing 101c. An oil separator (not shown) is provided in the high pressure port 149a, for separating oil (lubricating oil) from the refrigerant.

The low pressure port 149b is formed in the front housing 101a for communicating a space defined by the middle housing 101b and the fixed scroll 142 with the evaporator 24 and the third bypass passage 36, through an inside space of the front housing 101a.

The discharge valve 148a and a valve stopper 148b are fixed to the base plate 142a of the fixed scroll 142 by a bolt 148c, wherein the discharge valve 148a is a check valve of a reed valve type for preventing the discharged refrigerant from flowing back to the working chamber V from the high pressure chamber 145, and the stopper 148b is a plate for limiting the movement of the reed valve 148a.

The spool 148d is a switching valve for opening and closing the communication port 147 (also referred to as the inlet port 147), so that the operation of the compressor device 140 is switched over from the compression operation to the expansion operation or vise versa. The spool 148d is arranged in a back pressure chamber 148e formed in the rear housing 101c in a sliding manner. A spring 148f is disposed in the back pressure chamber 148e to urge the spool 148d in a direction to close the inlet port 147.

A control valve (an electromagnetic valve, not shown) is provided in the rear housing 101c, for controlling the pressure in the back pressure chamber 148e, by communicating the back pressure chamber 148e with a space on a side of the low pressure port 149b or with the high pressure chamber 145. The control valve is controlled by the control unit (not shown).

When the electromagnetic valve is opened by the control unit, the pressure in the back pressure chamber 148e is decreased lower than that in the high pressure chamber 145. Then, the spool 148d is moved against the spring force of the spring 148f in a direction (in a rightward direction in FIG. 4) to open the inlet port 147.

When the electromagnetic valve is closed, the pressure in the back pressure chamber 148e becomes equal to that in the high pressure chamber 145, and the spool 148d is moved by the spring force of the spring 148f in the direction (in the leftward direction in FIG. 4) to close the inlet port 147. As above, the spool 148d, the back pressure chamber 148e, the spring 148f, and the electromagnetic valve constitute a pilot-type electric valve for opening and closing the inlet port 147.

The transmission device 160 comprises a sun gear 161 provided at a center of the device 160, a planetary carrier 162 having multiple pinion gears 162a which move around the sun gear 161 and rotate on their own axes, and a ring-shaped internal gear (ring gear) 163 provided at outer peripheries of the pinion gears 162a.

The sun gear 161 is integrally formed with a rotor portion 132 of the electric motor 130, the planetary carrier 162 is integrally fixed to the driving shaft 111, and the ring gear 163 is connected to the compressor shaft 141 on the opposite side of the eccentric portion.

A one-way clutch 111b is provided on the driving shaft 111, so that a rotation of the driving shaft 111 is allowed only in one direction (a forward direction). Bearings 116 and 117 rotationally support the sun gear 161, namely the rotor portion 132 with respect to the driving shaft 111, a bearing 118 rotationally supports the driving shaft 111 (the planetary carrier 162) with respect to the compressor shaft 141, and a bearing 141g rotationally supports the compressor shaft 141 with respect to the middle housing 101b.

A shaft seal 119 is a seal for preventing the refrigerant from flowing out of the front housing 101a through a gap between the driving shaft 111 and the front housing 101a.

The expansion device 150 is the vane type device identical to that of the first embodiment, and is arranged at a side of the electric motor 130 to the pulley 110. The rotor 152 of the expansion device is arranged to be rotated by the superheated gas-phase refrigerant in the backward direction. The rotor 152 is rotatable with respect to the driving shaft 111 and connected to the rotor portion 132 of the electric motor 130 via the switching device 158 (a reverse input cutting clutch). The switching device 158 is a clutch which allows a power transmission from one side to the other side, but prohibits a power transmission from the other side to the one side. More specifically, the rotational driving force generated at the expansion device 150 (the rotor 152) can be transmitted to the electric motor 130 (the rotor portion 132), irrespectively whether the rotational direction is in the forward or the backward direction. On the other hand, the rotational force of the electric motor 130 (the rotor portion 132) can not be transmitted to the expansion device 150 (the rotor 152).

Now, an operation of the fluid machine 100 as described above will be explained.

(1. Operation When the Air Conditioning Operation is Performed)

The on-off valve of the refrigerating cycle 20 is opened by the control unit (not shown), the refrigerant pump 32 for the Rankine cycle 30 is operated, and the switching valve 34 is switched to the expansion device 150. The electromagnetic valve in the rear housing 101c is closed and thereby the inlet port 147 is closed by the spool 148d. When the engine 10 is running, the electromagnetic valve 120 is turned on.

The driving force of the engine 10 is transmitted to the compressor device 140 through the pulley 110, the driving shaft 111, the transmission device 160 (the rotational speed is increased) and the compressor shaft 141 (this operation corresponds to a line "a" in FIG. 5). The compressor device 140 is operated as the ordinal scroll compressor. The compressor device 140 sucks the refrigerant from the low pressure port 149b, compresses the refrigerant in the working chambers V, discharges the compressed refrigerant to the high pressure chamber 145 through the discharge port 146, and finally discharges the high pressure refrigerant through the high pressure port 149a.

The discharged refrigerant is circulated from and back to the compressor device 140, through the on-off valve 25, the heat radiating device 21, the gas-liquid separator 22, the depressurizing device 23, the evaporator 24 and the check valve 24a. The air is cooled down at the evaporator 24a.

A certain amount of oil is included in the refrigerant, and the oil cools down and lubricates the respective components in the fluid machine when the refrigerant (including the oil) flows into the fluid machine 100 through the low pressure port 149b and flows to the compressor device 140 through the expansion device 150, the electric motor 130, and the transmission device 160. When the refrigerant is discharged through the high pressure port 149a, the oil is separated from the refrigerant by the oil separator provided in the rear housing 101c, so that flow-out of the oil into the refrigerating cycle is suppressed.

In the expansion device 150, the superheated gas-phase refrigerant, which is heated by the refrigerant heating device 33, is supplied to the inlet port 156 of the expansion device 150, due to the operation of the refrigerant pump 32. The superheated refrigerant is introduced into the working chambers V and expanded therein, so that the rotor 152 is rotated in the backward direction.

The rotational driving force generated at the expansion device 150 is transmitted from the rotor 152 to the rotor 132 of the electric motor 130 through the switching device (reverse input cutting clutch) 158. The rotor 132 of the electric motor 130 is thereby rotated in the backward direction and operated as the electric power generator. (The electric motor 130 can be, however, operated as the electric motor during the above operation) Due to the power generation at the expansion device 150 and the transmission device 160, the compressor device 140 can be driven at a higher speed (this operation corresponds to a line "b" in FIG. 5).

The refrigerant of the low pressure after the expansion at the expansion device 150 flows out of the outlet port 157. The refrigerant flows back to the refrigerant pump 32, through the second bypass passage 35, the check valve 35a, the heat radiating device 21, the gas-liquid separator 22, and the first bypass passage 31.

In the case that the engine operation is stopped due to an idle-stop operation or at a low speed running of the vehicle (having a hybrid engine), the electromagnetic clutch 120 is turned off by the control unit, and the electric motor 130 is operated as the ordinal motor to generate the rotational force. In this operation, the electric motor 130 is rotated in the backward direction. When the driving shaft 111 tends to rotate in the backward direction through the transmission device 160, the rotation of the driving shaft 111 is prevented by the one way clutch 111b. As a result, the rotational driving force of the electric motor 130 is transmitted to the compressor device 140 through the transmission device 160, wherein the rotational speed of the electric motor 130 is reduced because of the transmission device 160. As above, the compressor device 140 can be continuously operated and thereby the air conditioning operation can be continued, even when the engine operation is temporarily stopped. In the above operation, the expansion device 150 is continuously operated by the superheated refrigerant, and the driving force generated at the expansion device 150 is continuously applied to the electric motor 130 and the compressor device 140. (This operation corresponds to a line "c" in FIG. 5).

In the case that the waste heat is sufficiently collected from the engine 10 and a sufficient driving force can be obtained at the expansion device 150, the electromagnetic clutch 120 is turned off by the control unit, whether or not the engine 10 is operating. In such a case, the compressor device 140 is operated only by the driving force from the expansion device 140. The driving force of the expansion device 150 is also applied to the electric motor 130 to operate it as the electric power generator.

(2. Operation When the Air Conditioning Operation is Stopped)

The on-off valve 25 is closed, the refrigerating pump 32 is operated, and the switching valve 34 is switched to the compressor device 140 by the control unit (not shown), independently whether the engine 10 is operated or stopped. The electromagnetic valve in the rear housing 101c is opened and thereby the inlet port 147 is opened by the spool 148d. The electromagnetic clutch 120 is turned off.

The superheated high-pressure gas-phase refrigerant, which is heated by the refrigerant heating device 33, is supplied into the working chambers V of the compressor device 140, through the switching valve 34, the high pressure port 149a, the high pressure chamber 145, and the inlet port 147. Since the superheated gas-phase refrigerant is not supplied from the refrigerant heating device 33 to the expansion device 150, the expansion device 150 is not operated.

Due to the operation of the compressor device 140 as the expansion device, the movable scroll 143 is rotated in the backward direction. The rotational driving force generated at the compressor device 140 tends to rotate the driving shaft 111 in the backward direction, through the transmission device 160. The rotation of the driving shaft 111 in the backward direction is, however, prevented by the one way clutch 111b. As a result, the rotational driving force generated at the compressor device 140 is transmitted to the electric motor 130 through the transmission device 160, wherein the rotational speed is increased. The electric motor 130 is thereby operated as the electric power generator (This operation corresponds to a line "d" in FIG. 5). In this operation, the electric motor 130 can be rotated without being affected by the expansion device 150, because the rotational driving force generated at the compressor device 140 is prevented from being transmitted to the expansion device 150 due to the switching device 158

The refrigerant of the low pressure after the expansion at the compressor device 140 (operating as the expansion device) flows out of the low pressure port 149b. The refrigerant flows through the low pressure port 149b, the third bypass passage 36, the check valve 36a, the heat radiating device 21, the gas-liquid separator 22, the first bypass passage 31, the refrigerant pump 32, the refrigerant heating device 33, the switching valve 34 and back to the compressor device 140 (operating as the expansion device).

According to the above described second embodiment, the fluid machine has the following advantages.

The compressor device 140 of the fluid machine 100 has functions of the compression operation and the expansion operation. The electric motor 130 is connected to the compressor device 140 and the expansion device 150, and the switching device 158 is provided between the electric motor 130 and the expansion device 150 for cutting the transmission of the rotational force from the electric motor 130 to the expansion device 150.

Accordingly, the waste heat from the engine 10 can be always collected by the expansion device 150 or the expansion operation of the compressor device 140, irrespectively whether or not the compression operation by the compressor device 140 is performed.

When the compressor device 140 is operating as the compressor, the expansion device 150 is connected to the electric motor 130 through the switching device 158, so that the rotational driving force generated at the expansion device 150 can be transmitted to the electric motor 130, or to both of the electric motor 130 and the compressor device 140.

When the compressor device 140 is operating as the expansion device, the expansion device 150 is disconnected from the electric motor due to the switching device 158, so that the compressor device 140 can operate as the expansion device without receiving a resistance from the expansion device 150. Accordingly, the expansion operation by the compressor device 140 can be effectively performed without energy loss, and the generated rotational driving force can be applied to the electric motor 130.

Furthermore, since the transmission device 160 is provided between the compressor device 140 and the electric motor 130, the rotational speed of the electric motor 130 to be transmitted to the compressor device 140 can be decreased. As a result, a high speed and low torque electric motor can be used as the electric motor 130, and thereby the electric motor 130 can be made smaller in size. Furthermore, the rotational speed of the driving force generated at the compressor device 140 (operating as the expansion device) and transmitted to the electric motor 130 can be increased. As a result, the amount of the electric power generated at the electric motor 130 can be increased.

Since the refrigerant to be sucked into the compressor device 140 flows from the low pressure port 149b to the compressor device 140 through the inside of the housing 101, namely through the expansion device 150, the electric motor 130, and the transmission device 160, those devices can be cooled down by the refrigerant, to thereby improve duration of life of those devices.

Furthermore, the devices 150, 130, 160 and 140 are lubricated by oil included in the refrigerant, to improve life-time of sliding portions of those devices.

An electromagnetic clutch can be used as the switching device 158 (the reverse input cutting clutch).

Other Embodiments

The arrangement of the electric motor 130, the compressor 140 and the expansion device 150 in the housing 101 is not limited to the order shown in the above embodiments.

In the above embodiments, the electric motor 130, the compressor 140 and the expansion device 150 are integrally formed in the housing. However, as alternative, the electric motor 130 and the expansion device 150 can be integrally formed, and a compressor of the conventional device can be connected to the electric motor and the expansion device.

Other types of the compressor device or the expansion device can be used. For example, the swash plate type or the rotary type compressor can be used.

The invention of the above embodiments is explained as the examples to be used in the motor vehicle having the idle-stop function or the hybrid engine. The present invention can be used for the other type vehicles.

What is claimed is:

1. A fluid machine comprising:
   a compressor device for compressing working fluid;
   an expansion device for generating a rotational driving force by collecting waste heat from an external driving source, wherein the expansion device is capable of being operated concurrently with operation of the compressor device;
   an electric rotating device having functions of an electric motor and an electric power generator, wherein the expansion device is operatively connected to the electric rotating device and the compressor device; and
   a switching device provided between the compressor device and the expansion device for connecting or disconnecting the compressor device with or from the expansion device.

2. A fluid machine according to claim 1, farther comprising: a transmission device between the compressor device and the expansion device for transmitting the driving force from the expansion device to the compressor device, wherein a rotational speed of the transmitted driving force is changed.

3. A fluid machine according to claim 1, further comprising: an external driving portion to be driven by the external driving source, wherein
   the external driving portion is connected to one of the compressor device, the expansion device and the electric rotating device, and
   the external driving portion has a switching means for selectively transmitting the driving force from the external driving source to one of the compressor device, the expansion device and the electric rotating device.

4. A fluid machine according to claim 1, wherein the switching device comprises an electromagnetic valve.

5. A fluid machine according to claim 1, wherein the compressor device, the electric rotating device and the expansion device are integrally formed in a housing.

6. A fluid machine according to claim 1, wherein the compressor device, the expansion device and the electric rotating device are arranged in series.

7. A fluid machine according to claim 5, wherein the working fluid flows inside of the housing.

8. A fluid machine according to claim 1, wherein the working fluid includes lubricating oil.

9. A fluid machine comprising:
- a compressor device having a function of compressing working fluid and a function of expanding the working fluid;
- an expansion device for generating a rotational driving force by collecting waste heat from an external driving source, wherein the expansion device is capable of being operated concurrently with operation of the compressor device;
- an electric rotating device having functions of an electric motor and an electric power generator, wherein the electric rotating device is operatively connected to the compressor device and the expansion device; and
- a switching device provided between the electric rotating device and the expansion device for connecting or disconnecting the electric rotating device with or from the expansion device.

10. A fluid machine according to claim 9, further comprising: a transmission device between the compressor device and the electric rotating device, wherein the transmitting device transmits a rotational driving force generated at the compressor device, when it is operated as an expansion device, to the electric rotating device, and a rotational speed to be transmitted to the electric rotating device is changed, and the transmitting device further transmits a rotational driving force generated at the expansion device to the compressor device through the electric rotating device, and a rotational speed to be transmitted to the compressor device is changed.

11. A fluid machine according to claim 9, wherein the switching device comprises a reverse input cutting clutch for transmitting a driving force from the expansion device to the electric rotating device, the switching device preventing the transmission of the rotational force from the electric rotating device to the expansion device.

* * * * *